United States Patent [19]

Stalteri

[11] 4,287,629
[45] Sep. 8, 1981

[54] PROCESS AND APPARATUS FOR THE PRODUCTION OF SYNTHETIC CHAMOIS LEATHER FOOTWEAR

[76] Inventor: Franco Stalteri, Via Francesco Crispi 44, 91025 Marsala, Italy

[21] Appl. No.: 94,164

[22] Filed: Nov. 14, 1979

[30] Foreign Application Priority Data

Jul. 31, 1979 [IT] Italy .............................. 68588 A/79

[51] Int. Cl.³ ...................... A43D 9/00; A43B 23/16
[52] U.S. Cl. ................................ 12/142 R; 36/45; 36/98
[58] Field of Search ................... 36/45, 98; 12/142 R, 12/142 E, 142 EV

[56] References Cited

U.S. PATENT DOCUMENTS 2,507,726  5/1950  Hollier et al. ............................ 36/45
4,151,662  5/1979  Vistins ................................... 36/98

FOREIGN PATENT DOCUMENTS 919882  1/1973  Canada .............................. 12/142 E
813984  6/1937  France .............................. 12/142 E

*Primary Examiner*—Patrick D. Lawson
*Attorney, Agent, or Firm*—Frailey & Ratner

[57] ABSTRACT

A process for the production of synthetic plastic chamois leather footwear, comprising injection molding of the uppers of the footwear of plastics, attaching the sole and heel thereto, coating the uppers with adhesive and flocking them in a flocking machine with rayon flock having a certain count and length. To prevent the sole and heel from being flocked, too, they are inserted in an appropriate sole protection mold during the flocking operation.

5 Claims, 3 Drawing Figures

U.S. Patent   Sep. 8, 1981   4,287,629
FIG. 1
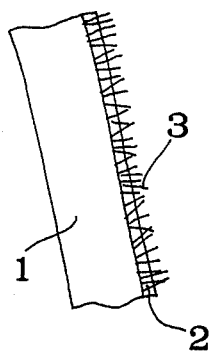
FIG. 3
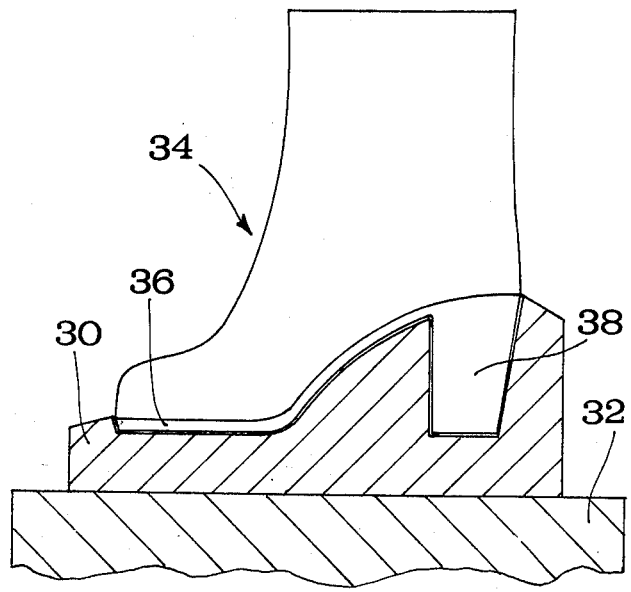
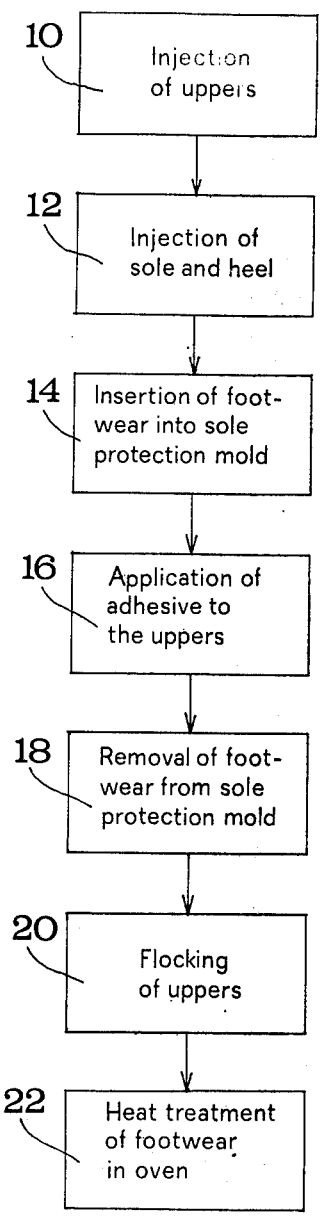
FIG. 2

PROCESS AND APPARATUS FOR THE PRODUCTION OF SYNTHETIC CHAMOIS LEATHER FOOTWEAR

BACKGROUND OF THE INVENTION

This invention relates to a process and apparatus for the production of synthetic chamois leather footwear and the footwear obtained thereby.

Various methods for producing footwear of synthetic plastic material such as PVC or polyurethane are known. In one of these methods liquid PVC is poured into a mold having the shape of the footwear to be produced and the liquid PVC fills the entire mold by gravity. This method is generally referred to as "slash molding".

A more sophisticated method is that of injection molding which permits to use plastics of higher density and thus to obtain footwear of higher quality. In this method it is common to stretch a stocking over the inner core of the mold to allow it to be impregnated by the injected plastic material and thus form an inner lining for the footwear.

According to another known method, sheets of thermoplastic rubber material are produced, cut according to appropriate patterns, sewn around a mold for forming the footwear and given their final permanent shape in an autoclave.

In all these prior art methods, the final product is footwear whose exterior aspect is immediately associated by an observer with a low level of elegance as this footwear usually has a smooth glossy appearance which is typical of inexpensive molded plastic materials such as PVC. This unsatisfactory aspect has therefore prevented widespread use of such footwear, notwithstanding the advantage of a low cost. In fact, for most applications of footwear a high level of elegance is required. So the use of such methods and materials has been limited to so-called "rain" footwear such as boots, ankle-boots and leggings, particularly for sports, as well as inexpensive sandals such as beach sandals.

SUMMARY OF THE INVENTION

It is therefore an object of the present invention to provide a process and apparatus for the production of footwear of the type described above, which permits to obtain a final product of highly improved properties with regard to the exterior aspect and elegance of the footwear without substantially increasing its production cost.

More particularly, it is an object of the present invention to provide footwear such as boots, ankle-boots, shoes or sandals for men and ladies, having an extremely realistic imitation of chamois leather, so that such footwear can be used where it is desired to give an impression of elegance as is normally desired in every-day city life.

Still more particularly, it is an object of the invention to provide footwear having a chamois aspect and affording the effect of real chamois leather including the so-called "writing" property which is typical of the natural chamois.

These and other objects and advantages, which will become apparent in the course of the following description, are achieved according to the present invention by a process for the production of synthetic chamois leather footwear, wherein uppers are produced by injection molding or pouring and a sole is attached to the uppers and the improvement comprises flocking the uppers after attachment of the sole with rayon flock of a count of less than 1 denier and a fiber length of less than 1 mm.

BRIEF DESCRIPTION OF THE DRAWINGS

FIG. 1 is a sectional view, on a greatly enlarged scale, of a part of footwear produced by the process according to the invention;

FIG. 2 is a block diagram illustrating the production steps in the process according to the invention;

FIG. 3 is a side view of footwear being processed and mounted on an implement used in carrying out the process.

DESCRIPTION OF RELATED ART AND PREFERRED EMBODIMENT

In other technical fields it is known to correct the smooth feel or even slipperiness of molded plastic articles by flocking methods in which a flock of short fibers, mostly of nylon, having a length of, for example, a few millimeters, is adhesively attached to the surface of the plastic article which has previously been spread with adhesive, using electrostatic attraction methods to produce complete and uniform adhesion of the flock to the plastic article. In this manner the article acquires a surface finish known as "velvet effect" which, on the one hand, slightly improves the quality of the article and, on the other hand, gives it different properties such as reduced slipperiness which may be useful, for example, for coat-hangers and the like.

Attempts made previously by the present Applicant to apply the flocking method to the production of footwear to improve its quality have however given quite unsatisfactory results as this effect is uncommon and undesirable in elegant footwear. What would be desirable, however, is a chamois leather effect which is quite different from the velvet effect so that it would catch the eye even of a casual observer both because of its different general aspect and particularly because chamois, if it is to be realistic, must have the so-called "writing" property. This property, as is well known in the art, consists in that the hair of the chamois leather or other product having this property, when rubbed by a finger or hand, is capable of receiving and maintaining a combed appearance or inclination of the hair in different directions so as to give reflecting effects which are slightly irridescent, i.e. are brighter or darker depending on the manner in which it has been treated and on the direction of the light falling on the hair.

Another difficulty encountered by the Applicant was that in applying the method on an industrial scale it was inevitable to apply the adhesive by spraying and this resulted in application of the adhesive to the entire surface of the footwear to be flocked without any possibility of excluding certain well defined areas. Consequently, the footwear was flocked all over its surface from the uppers to the sole thereby destroying immediately any effect of elegance that was intended to be obtained, for it is unacceptable that the edge of the sole or heel be flocked as well. Of course, flocking of the sole and heel can be avoided if the adhesive is applied carefully with a brush or the sole and heel are masked with adhesive tape which is subsequently removed, but these methods are unacceptable for industrial mass production because of the high cost for manpower required by the increased number of individual operations to be carried out such as the subsequent removal of the protective adhesive tape.

Another difficulty encountered by the Applicant with this method was that often the adhesive applied by spraying in preparation of the subsequent flocking operation tended to flow and form drops or clots because of inevitable incidental irregularities in the application of the adhesive. These drops of adhesive caused flaws in the finish of the produced article so that it had to be scrapped.

These and other difficulties have been overcome by the Applicant by a number of steps and discoveries which have led to the present invention. More particularly, according to the invention it has been discovered that an extremely realistic chamois effect can be obtained by flocking the footwear, after it has been spread with adhesive, with a flock of fiber material such as viscose or polynose rayon having a count of less than 1 denier, preferably 0.5 denier, and a gauged length of less than 1 mm, preferably 0.5–0.6 mm. Further, it has been discovered that for obtaining this chamois effect it is necessary to carry out the flocking operation with this flock on a relatively rigid support such as a support formed of a PVC or thermoplastic polyurethane layer having a thickness of at least 1.5 mm and preferably 2 or more mm.

By using the flock as specified above, together with the other steps recited, surprisingly an imitation chamois leather effect has been obtained that is very realistic both in its general aspect even to an expert eye and particularly also with respect to the "writing" property of the produced finish. Although the Applicant does not claim to have completely understood all the theoretical reasons why the aforementioned steps permit to achieve the desired final result which could not be achieved by the conventional flocking methods in spite of the numerous attempts made by the footwear producing industry, it is believed that at least in part this effect is to be ascribed to the high flexibility of the fibers due to the low count used, together with the inherent flexibility of rayon, and also to the fact that the fibers are supported by a relatively rigid support so that the fibers are not noticeably deformed by rubbing the surface of the footwear. The importance of the rigidity of the support is also confirmed by the fact that flocking experiments made by using the same flock on flexible supports such as fabrics did not provide the same "writing" property that could be achieved on relatively thick PVC footwear.

It is also believed that the adhesive causes a slight solubilization of the surface of the plastic support material so that the flock penetrates into the support material as if it were hair or natural skin. Finally, it is believed that a correct selection of the fiber length is of great importance.

FIG. 1 shows a part of footwear made by the process according to the invention and illustrates by way of example the stratification of the various layers of which it is composed. A PVC support material forming the wall of the uppers of the footwear is indicated by 1, an adhesive layer is indicated by 2 and 3 denotes a flock material applied to the adhesive layer 2.

Apart from the aforementioned indications on the nature of the flock and support materials, the flocking operation can be carried out in the conventional manner. Suitable flocking machines by which the desired results can be obtained are particularly those produced by Aigle Email of Borgaro Torinese, Italy, although it is believed that the same results can be achieved with other flocking machines. Also the adhesive used for flocking may be of the conventional type, but it should be of a type requiring some time for setting, for example a few minutes, to avoid uneven flocking, particularly in view of the considerable size that the footwear may sometimes assume.

To avoid dripping of the adhesive applied by spraying, it has been found advantageous to use a mold for forming the uppers, whose inner surface is sanded instead of smooth as conventionally. In fact, by sanding the mold the produced uppers will have a rough surface which in turn will restrain the flow of the adhesive sprayed thereon and will drastically reduce or eliminate dripping of adhesive to the extent of having to scrap the produced articles.

The production of the footwear prior to the flocking operation can be carried out by any of the methods described above, but injection molding of high density PVC or thermoplastic polyurethane is preferred. Such molding can be carried out in the conventional manner by applying a fabric stocking to the core of the mold and injecting then into the mold, after it has been closed, the plastic material in the liquid state until the mold is completely filled, to thus produce the uppers. The uppers thus produced can be flocked before the sole and heel are secured thereto, but this involves a considerable increase of cost relative to the immediate attachment of the sole before withdrawing the uppers from the mold as is known in the art. As mentioned above, it should be avoided that the immediate attachment of the sole leads to the sole and heel being partly covered by the subsequently applied flock and, to achieve this, a preferred embodiment of a process and apparatus, which are particularly adapted for industrial mass production at low cost, will now be described with reference to FIG. 2.

The process comprises a first step 10 in which the uppers are molded. In this step the uppers are molded by injection of liquid high density PVC under pressure, as is known in the art, using a mold as conventionally used for the production of so-called "rain" footwear, but unlike the conventional mold the present mold is preferably sanded on its surface for molding the outer surface of the uppers. In addition to sanding, the surface of the mold may be provided with patterns for imitating various kinds of natural skins such as wild boar, ostrich and the like. The mold may also be provided with fancy patterns for imitating skins that do not exist in nature.

Before injection a stocking of resilient fabric adapted to be embedded in the subsequently injected plastic material for forming a lining may be applied to the core of the mold in the conventional manner. However, in view of the highly aesthetic quality of the footwear to be produced, a lining of foam material or resilient mock leather is preferred.

The molding operation is preferably carried out industrially on a molding machine having a rotary table provided with a plurality of molds. The use of Ottogalli machines has proved particularly advantageous, but any other type of injection machines can be used.

After injection of the PVC into the mold for the uppers, the mold for forming the bottom of the footwear, i.e. the sole and heel, is attached to the mold for the uppers in a manner well known in the art of making footwear of plastics, if desired, with the insertion of reinforcements for the instep and the like. Then the plastic material for the bottom is injected in the conventional manner to produce within the mold the footwear complete with uppers and bottom portion. This step 12 is substantially conventional.

After removal of the footwear thus produced from the mold, the footwear is inserted in a sole protection mold 30 shown in FIG. 3. The sole protection mold 30 is essentially an exact copy of the mold used for making the sole and heel. The sole protection mold 30 is supported by a rotary table 32 rotatably driven by motor means, not shown. Thus, the sole protection mold 30 exactly fits the sole 36 and heel 38 of the footwear 34 and is capable of receiving and supporting it in an upright position on the rotary table.

The step of insertion of the footwear into the sole protection mold, schematically illustrated in FIG. 2, is followed by a step 16 of application of adhesive to the uppers. In this step an operator sprays a layer of adhesive onto the uppers while the footwear is rotating on the rotary table 32. During this step the adhesive cannot stick anywhere to the sole or heel as these are protected by the sole protection mold 30.

After having thus applied the adhesive, the footwear is removed from the sole protection mold, this step being denoted by 18 in FIG. 2. Then the footwear is transferred to the flocking step 20 which is carried out by a conventional flocking machine, for example, of the type manufactured by Aigle Email of Borgaro Torinese, Italy. In this machine the footwear is flocked with flock of the type described above with the aid of electrostatic attraction, as is known in the art.

After the flocking step, the footwear is subjected to a heat treatment step 22 in an oven to dry and set the adhesive. After this step the footwear is substantially finished.

Although in the preferred embodiment described above generally PVC is mentioned as the plastics material, it will be understood that other plastics such as thermoplastic polyurethane or thermoplastic rubber may be used instead.

Although an ankle-boot is shown in FIG. 3 merely by way of example, obviously the described process can also be used for the production of other types of footwear including sandals. However, when a sandal is to be produced, before the step 14 of insertion of the footwear into a sole protection mold, the sandal should be fitted on a wooden last to ensure correct positioning of the various parts forming the sandal for the subsequent application of the adhesive and the flocking operation as well as protection of the inner portions of the sandal from the adhesive. Fitting of the sandal on a last is not shown in the drawing as this is an operation that is obvious to one skilled in the art.

It is to be noted that although in the foregoing description reference has been made to the application of adhesive to PVC in preparation of the subsequent flocking operation, the adhesive may also be replaced by a layer of solvent adapted to solubilize the surface of the uppers when particular types of plastics are used such as thermoplastic rubber. Such superficial solubilization has an effect similar to that of the adhesive in the subsequent flocking treatment with the aid of the flocking machine. Also this modification of the process is to be considered as being included within the scope of the present invention.

Finally, the essential features of the invention can also be put into practice by flocking a sheet of thermoplastic material such as thermoplastic rubber according to the process as described above and then using this sheet for producing footwear by methods known in the art, for example, cutting and sewing the sheet together on a model and heat treating the resulting footwear in an autoclave to give it its final shape.

Thus, a preferred embodiment and several modifications of the present process and apparatus have been described and it is to be understood that all these and other modifications obvious to one skilled in the art are within the scope of the present invention as defined by the appended claims.

I claim:

1. In a process for the production of synthetic chamois leather footwear, wherein uppers are produced by injection molding or pouring and a sole is attached to the uppers, the improvement comprising, after attachment of the sole, coating the uppers with a thin layer of adhesive and then flocking the uppers with rayon flock of a count of less than 1 denier and a fiber length of less than 1 mm.

2. In a process for the production of synthetic chamois leather footwear, wherein uppers are produced by injection molding or pouring and a sole is attached to the uppers, the improvement comprising, after attachment of the sole, spreading a diluent over the uppers to superficially dissolve the synthetic plastic material thereof and then flocking the uppers with rayon flock of a count of less than 1 denier and a fiber length of less than 1 mm.

3. In a process for the production of synthetic chamois leather footwear, wherein uppers are produced by injection molding or pouring and a sole is attached to the uppers, the improvement comprising, after attachment of the sole, inserting the footwear in a sole protection mold to prevent the sole and heel from being flocked and then flocking the uppers with rayon flock of a count of less than 1 denier and a fiber length of less than 1 mm.

4. A process for the production of synthetic chamois leather footwear, comprising injection molding of the uppers in a mold having an at least partially sanded inner surface, attaching a sole and heel to the uppers and flocking the uppers with rayon flock of a count of less than 1 denier and a fiber length of less than 1 mm.

5. Synthetic chamois leather footwear as produced by the process of claim 1.

* * * * *